United States Patent
Cai et al.

(10) Patent No.: US 8,391,899 B2
(45) Date of Patent: Mar. 5, 2013

(54) TEXT MESSAGE DELIVERY TO A MOBILE DEVICE IN A WIRELESS COMMUNICATION NETWORK

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 411 days.

(21) Appl. No.: 12/725,303

(22) Filed: Mar. 16, 2010

(65) Prior Publication Data

US 2011/0230212 A1     Sep. 22, 2011

(51) Int. Cl.
H04W 4/00     (2009.01)
(52) U.S. Cl. ........................................... 455/466
(58) Field of Classification Search .............. 455/466
See application file for complete search history.

(56) References Cited

U.S. PATENT DOCUMENTS

| | | | |
|---|---|---|---|
| 2004/0067753 A1* | 4/2004 | Berg et al. | 455/435.1 |
| 2006/0084431 A1* | 4/2006 | Hua et al. | 455/433 |
| 2010/0261490 A1* | 10/2010 | Berry et al. | 455/466 |
| 2010/0331023 A1* | 12/2010 | Cai et al. | 455/466 |
| 2011/0119363 A1* | 5/2011 | Hua et al. | 709/223 |

FOREIGN PATENT DOCUMENTS

WO     WO 2009118315 A1 *  10/2009

OTHER PUBLICATIONS

3GPP TS 23.204 v8.3.0 Sep. 2009.*
3GPP TS 23.401 v8.5.0. Mar. 2009. pp. 1-179.*
NP-020253. Jun. 2002.*

* cited by examiner

*Primary Examiner* — Nathan Mitchell
(74) *Attorney, Agent, or Firm* — Duft Bornsen & Fishman, LLP

(57) ABSTRACT

Systems and methods are disclosed that deliver a text message to a mobile device in a wireless communication network, where a prior delivery attempt to the mobile device in the wireless communication network has failed. The system in one embodiment includes a subscriber server in an IMS network that receives a first request from a message center to be notified if the mobile device becomes available in the wireless communication network. The subscriber server transmits a second request to a subscriber database in the wireless communication network to be notified if the mobile device becomes available. If the mobile device does become available, the subscriber server receives a first notification from the subscriber database that the mobile device has become available. The subscriber server then transmits a second notification to the message center that the mobile device has become available.

20 Claims, 6 Drawing Sheets

TEXT MESSAGE DELIVERY TO A MOBILE DEVICE IN A WIRELESS COMMUNICATION NETWORK

FIELD OF THE INVENTION

The invention is related to the field of communications and, in particular, to delivery of a text message to a mobile device in a wireless communication network where the mobile device was not available for a prior delivery attempt.

BACKGROUND

Text messaging has become a very popular mode of communication in many wireless communication networks. One example of text messaging is Short Message Service (SMS), which is a communication protocol allowing the exchange of short text messages (i.e., 160 characters) between mobile devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

A sender of a new text message enters one or more intended destinations for the message in a user device (e.g., a phone), and also enters the content of the message. The user device of the sender formats the text message into the proper protocol, and sends the text message to a message center in the network over the appropriate signaling channels. One example of a typical message center is an SMS Center (SMSC). The SMSC then attempts to deliver the SMS message to its destination(s).

One particular type of wireless communication network is based on the GSM (Global Systems for Mobile Communications) standard, and is referred to as a GSM network (or GSM/UMTS network). A GSM network typically includes a Base Station Subsystem (which includes the base stations and their controllers) and the core network. The core network includes Mobile Switching Centers (MSC), a Home Location Register (HLR), and one or more message centers, such as an SMSC. The MSC is the primary service delivery node in the GSM network and is responsible for handling voice calls, SMS messages, and other services. The MSC sets up and releases the end-to-end connection, handles mobility and hand-over requirements during the call, etc. The HLR is a central database that stores details of each mobile device that is authorized to use the core network. The HLR stores data for a GSM subscriber, such as GSM services that the subscriber has requested, the present location of subscriber, registration information, etc.

Another type of wireless communication network is based on CDMA2000 standards, and is referred to herein as a CDMA network (or ANSI-41 network). A CDMA network uses CDMA channel access to send voice, data, and signaling between mobile phones and cell sites. The general CDMA2000 standards include CDMA2000 1X, CDMA2000 EV-DO Rev. 0, CDMA2000 EV-DO Rev. A, and CDMA2000 EV-DO Rev. B. Yet another type of wireless communication network is referred to as an IP Multimedia Subsystem (IMS) network. The IMS is an architectural framework for delivering Internet Protocol (IP) multimedia services. The IMS provides a common core network having a network architecture that allows for various types of access networks. The access network between an IMS device and the IMS network may be a cellular network (e.g., CDMA or GSM), a WLAN (e.g., WiFi or WiMAX), an Ethernet network, or another type of wireless or wireline access network. There may be other types of 3G and 4G communication networks that are used by service providers, such as Long Term Evolution (LTE) networks.

When a mobile device wants access to the GSM network, the mobile device first registers with the network by transmitting a register message to the GSM network. In response to the register message, the GSM network authenticates the mobile device and registers the mobile device for the requested services. The mobile device may then place or receive voice calls, send or receive text messages, etc.

After registration with the GSM network, the mobile device may be turned off, may move out of range of the GSM network, or may otherwise end communication with the GSM network. Even though the mobile device is no longer in communication with the GSM network, the HLR in the GSM network continues to store location mapping data or other data for the mobile device. The stored data indicates that the mobile device is still actively communicating with the GSM network when that is not the case. This may cause problems in the GSM networks or other wireless communication networks for delivering text messages.

For example, assume that a message center in a different network (such as a CDMA network or an IMS network) receives a text message that is addressed to the mobile device. Upon receipt of the text message, the message center (possibly through one or more intermediary devices) queries the HLR in the GSM network for routing information for the text message. Because the HLR stores location mapping data for the mobile device, the HLR responds to the message center with routing information for the text message. This indicates that the mobile device is available to receive the text message over the GSM network when actually the mobile device is not available. In response to the routing information, the message center forwards the text message to the MSC in the GSM network (possibly through one or more intermediary devices). The MSC attempts to deliver the text message to the mobile device, but the delivery attempt will fail because the mobile device is unavailable. The message center then queues the text message for one or more retry attempts. Each retry attempt will also fail because the mobile device is not available over the GSM network even though the HLR indicates that it is available. These failed delivery attempts unfortunately waste network resources.

SUMMARY

Embodiments described herein provide an improved way of attempting delivery of a text message to a mobile device over a wireless communication network (e.g., a GSM/UMTS network) when the mobile device was unavailable for a prior delivery attempt. Instead of merely retrying another delivery attempt, the message center (in the CDMA network or the IMS network) subscribes to be notified if the mobile device becomes available in the wireless communication network. The subscription is through a subscriber server (e.g., Home Subscriber Server (HSS) in the IMS network). The subscriber server in turn accesses a subscriber database (e.g., HLR) in the wireless communication network, and requests to be notified if the mobile device becomes available. If the mobile device does become available in the wireless communication network, then the subscriber database in the wireless communication network notifies the subscriber server in the IMS network. The subscriber server in the IMS network in turn notifies the message center that the mobile device has become available. The message center may then initiate a delivery attempt responsive to the notification that the mobile device is now available. This substantially increases the chance that the delivery attempt will be successful.

Even though the mobile device does not de-register with the wireless communication network, the message center will delay additional delivery attempts until it receives notification that the mobile device is available in the wireless communication network. This advantageously saves network resources.

One embodiment comprises a system operable to deliver a text message to a mobile device in a wireless communication network (e.g., a GSM/UMTS network), where a prior delivery attempt to the mobile device in the wireless communication network has failed. The system includes a subscriber server in an IMS network that receives a first request from a message center to be notified if the mobile device becomes available in the wireless communication network. The message center is located outside of the wireless communication network, such as in a CDMA network, an IMS network, etc. The subscriber server transmits a second request to a subscriber database in the wireless communication network to be notified if the mobile device becomes available in the wireless communication network. If the mobile device does become available in the wireless communication network, the subscriber server receives a first notification from the subscriber database in the wireless communication network that the mobile device has become available. The subscriber server then transmits a second notification to the message center that the mobile device has become available in the wireless communication network. This allows the message center to initiate delivery of the text message to the mobile device in the wireless communication network now that it is available.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
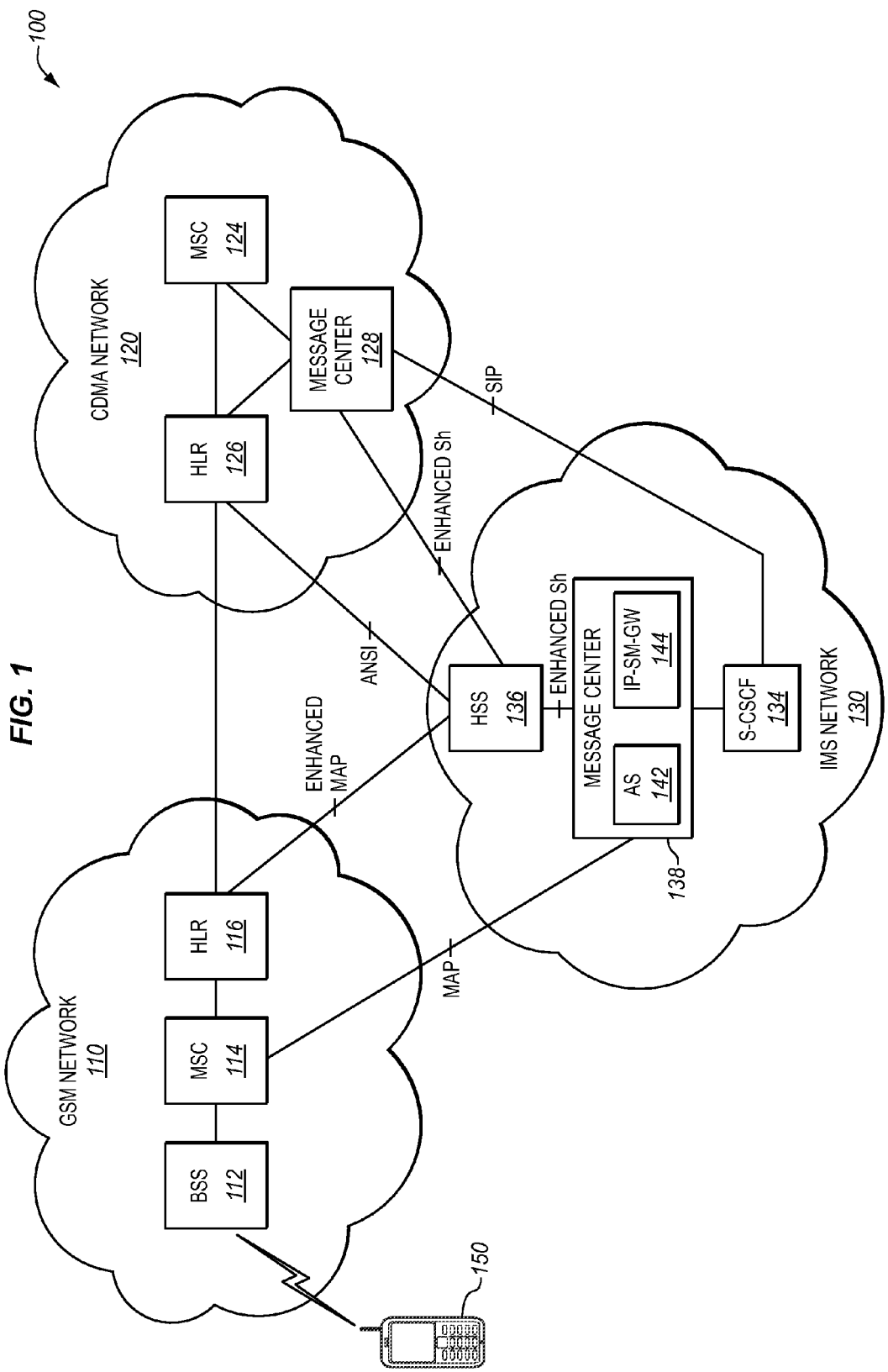
FIG. 1 illustrates a communication system in an exemplary embodiment.

FIG. 1 illustrates a communication system 100 in an exemplary embodiment. Communication system 100 includes multiple wireless communication networks, which are illustrated as GSM network 110, CDMA network 120, and IMS network 130 in this embodiment. The embodiments described below illustrate delivery of text messages to a mobile device 150 when the mobile device 150 becomes temporarily unavailable over a wireless communication network. Although the embodiments describe message delivery over GSM network 110, the concepts described herein may apply to other types of wireless communication networks.

GSM network 110 includes a Base Station Subsystem (BSS) 112, a Mobile Switching Center (MSC) 114, and a Home Location Register (HLR) 116. BSS 112 includes the base stations and their controllers (not shown) that enable communication with a mobile device 150 over an air interface. MSC 114 is the serving node for mobile devices, and is responsible for handling voice calls, SMS, and other services. HLR 116 is a central subscriber database that stores subscription information and other details, such as in subscriber profiles, of mobile devices that are authorized to use GSM network 110. When the term "GSM network" is used herein, it may refer also to a UMTS network, which is an evolution of GSM.

CDMA network 120 includes an MSC 124, an HLR 126, and a message center 128. MSC 124 is the serving node for mobile devices, and is responsible for handling voice calls, SMS, and other services in CDMA network 120. HLR 126 is a central subscriber database that stores subscription information and other details, such as in subscriber profiles, of mobile devices that are authorized to use CDMA network 120. Message center 128 comprises any node or element in CDMA network 120 that handles text messages. One example of message center 128 comprises a Short Message Service Center (SMSC). CDMA network 120 may include other network elements that are not shown for the sake of brevity, such as base stations, a base station controller (BSC), etc.

IMS network 130 includes a Serving-Call Session Control Function (S-CSCF) 134, a Home Subscriber Server (HSS) 136, and a message center 138. S-CSCF 134 is the central node of the signaling plane, and performs session control for IMS devices that initiate sessions over IMS network 130. S-CSCF 134 will communicate with IMS devices over one or more access networks that are not shown in FIG. 1. HSS 136 is a subscriber server that stores subscription-related information (e.g., subscriber profiles), performs authentication and authorization of end users, provides information about the subscriber's location, etc. Although shown as separate elements, HSS 136 and HLR 126 may be implemented on a common platform. Message center 138 comprises any node or element in IMS network 130 that handles text messages. Message center 138 may take on many forms in IMS network 130. Message center 138 may comprise an application server that handles text messages. Message center 138 may alternatively or additionally comprise an IP Short Message Gateway (IP-SM-GW), which is an entity that provides protocol interworking for the submission of short messages from the sender to S-CSCF 134 and for the delivery of short messages from S-CSCF 134 to a receiver. Because message center 138 may take on many forms, it is shown generally in FIG. 1 as including both application server 142 and IP-SM-GW 144. Those skilled in the art will appreciate that IMS network 130 may be part of a larger network referred to as a Long Term Evolution (LTE) network.

The networks shown in FIG. 1 communicate with one another through multiple interfaces, such as SIP, Diameter, MAP, etc. As will be described in more detail below, some of the interfaces are enhanced in these embodiments to allow for additional information to be communicated between the networks. In particular, the MAP interface between HLR 116 and HSS 136 is enhanced, and the Diameter Sh interface between message centers 128, 138 and HSS 136 is enhanced.

Assume for this embodiment that mobile device 150 enters the service area of GSM network 110. Mobile device 150 is a GSM-enabled device at a minimum, but may also be dual mode or multi-mode so it may also communicate with CDMA network 120 and/or IMS network 130 in addition to GSM network 110. When mobile device 150 first accesses GSM network 110, mobile device 150 transmits a register message to GSM network 110 that is received in MSC 114 through BSS 112. MSC 114 then forwards the registration information to HLR 116, which updates a subscriber profile for mobile device 150 (assuming mobile device 150 is in a home zone). Updating the subscriber profile may include determining or receiving location information for mobile device 150, and storing the location information in the subscriber profile. After mobile device 150 is properly registered, mobile device 150 may place or receive voice calls, send or receive text messages, etc, through GSM network 110.

After registration with GSM network 110, mobile device 150 may become temporarily unavailable to GSM network 110 at some point. For example, mobile device 150 may be turned off, may move out of range of GSM network 110, or may otherwise end communication with GSM network 110. During the time period that mobile device 150 is unavailable, mobile device 150 will be unable to receive text messages over GSM network 110. For example, assume that message center 128 in CDMA network 120 receives a text message that is addressed to mobile device 150. If message center 128 attempts to deliver the text message to mobile device 150 over GSM network 110, message delivery will fail because mobile device 150 is unavailable to GSM network 110. The following embodiments illustrate how message delivery may be attempted to mobile device 150 over GSM network 110 by message centers (e.g., message centers 128, 138) outside of GSM network 110.

FIGS. 2-5 are flow charts illustrating a method 200 of delivering a text message to mobile device 150 over a wireless communication network (e.g., GSM network 110) in an exemplary embodiment. The steps of method 200 will be described with reference to communication system 100 in FIG. 1, but those skilled in the art will appreciate that method 200 may be performed in other networks and systems. The steps of the flow charts described herein are not all inclusive and may include other steps not shown. The steps may also be performed in an alternative order.

Figure 2:
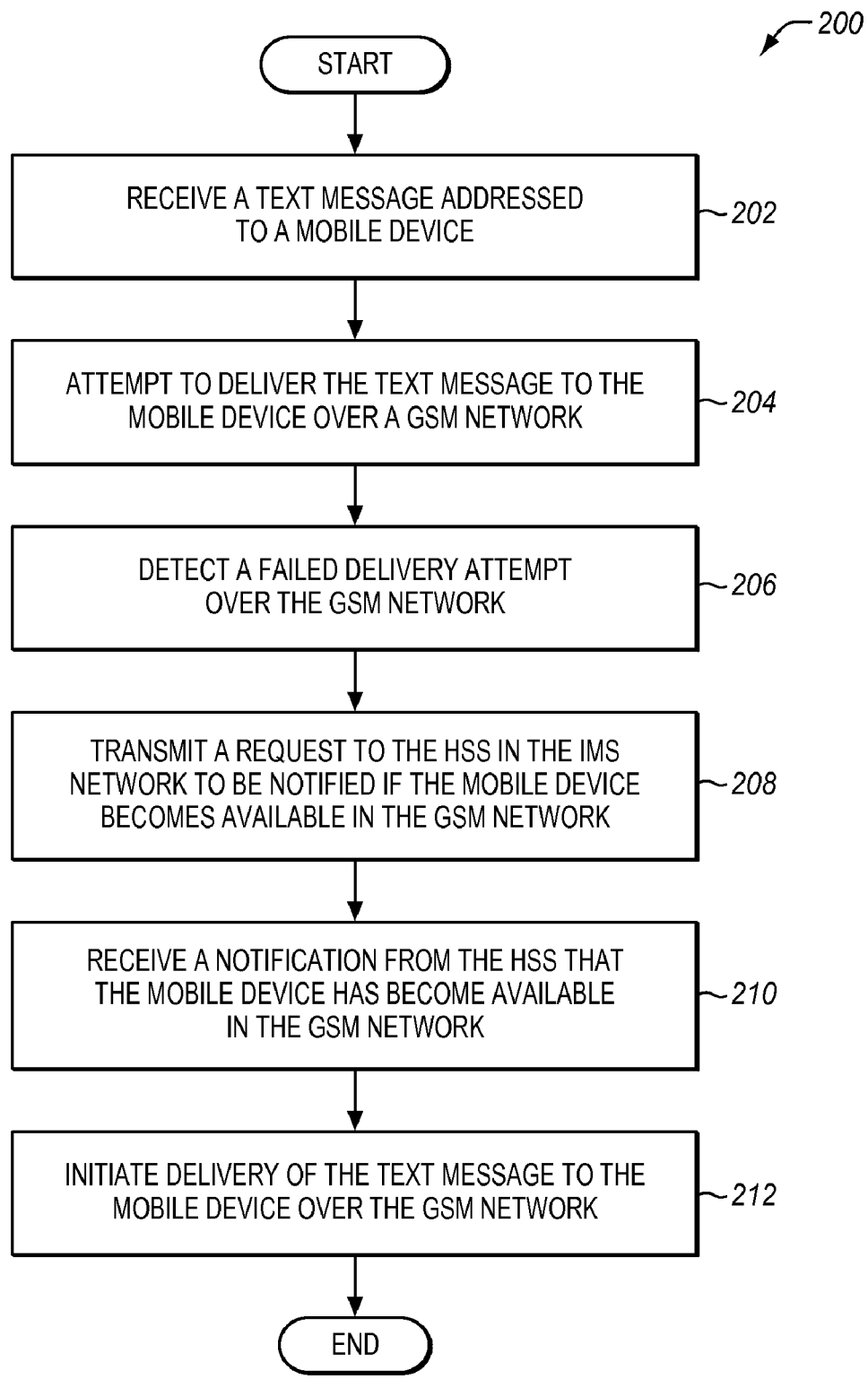
FIGS. 2-5 are flow charts illustrating a method of delivering a text message to a mobile device over a wireless communication network in an exemplary embodiment.

To start, FIG. 2 illustrates the steps of method 200 performed in message center 128 which support both 3GPP and 3GPP2 (ANSI) MAP protocols. In step 202, message center 128 receives a text message addressed to mobile device 150. In step 204, message center 128 attempts to deliver the text message to mobile device 150 over GSM network 110 (assuming message center 128 also supports 3GPP MAP protocol). For example, message center 128 may transmit a MAP mt-ForwardSM message to MSC 114 in GSM network 110, where the mt-ForwardSM message includes the text message. One assumption at this point is that mobile device 150 is temporarily unavailable in GSM network 110. Thus, this delivery attempt to mobile device 150 over GSM network 110 will fail.

Message center 128 detects the failed delivery attempt over GSM network 110 in step 206. For example, message center 128 may receive a response to the mt-ForwardSM message indicating an error or failure in the delivery attempt. In response to detecting the delivery failure, message center 128 does not merely queue the text message and attempt future delivery attempts based on retry protocol defined within message center 128. Instead, message center 128 requests to be notified if mobile device 150 becomes available again in GSM network 110, and then initiates a delivery attempt if mobile device 150 does become available.

To do so, message center 128 transmits a request to HSS 136 to be notified if mobile device 150 becomes available in GSM network 110 in step 208. The request in this embodiment may comprise a Diameter Sh Subscription-Notification-Request (SNR). The Diameter Sh interface may be enhanced so that the Data-Reference AVP in the SNR includes a new reference value that requests notification if mobile device 150 becomes available in GSM network 110. Those skilled in the art will appreciate that message center 128 may alternatively request notification from HLR 126, but that embodiment is not described herein. After transmitting the request to HSS 136, the process flow transfers to HSS 136 as shown in FIG. 3.

Figure 3:
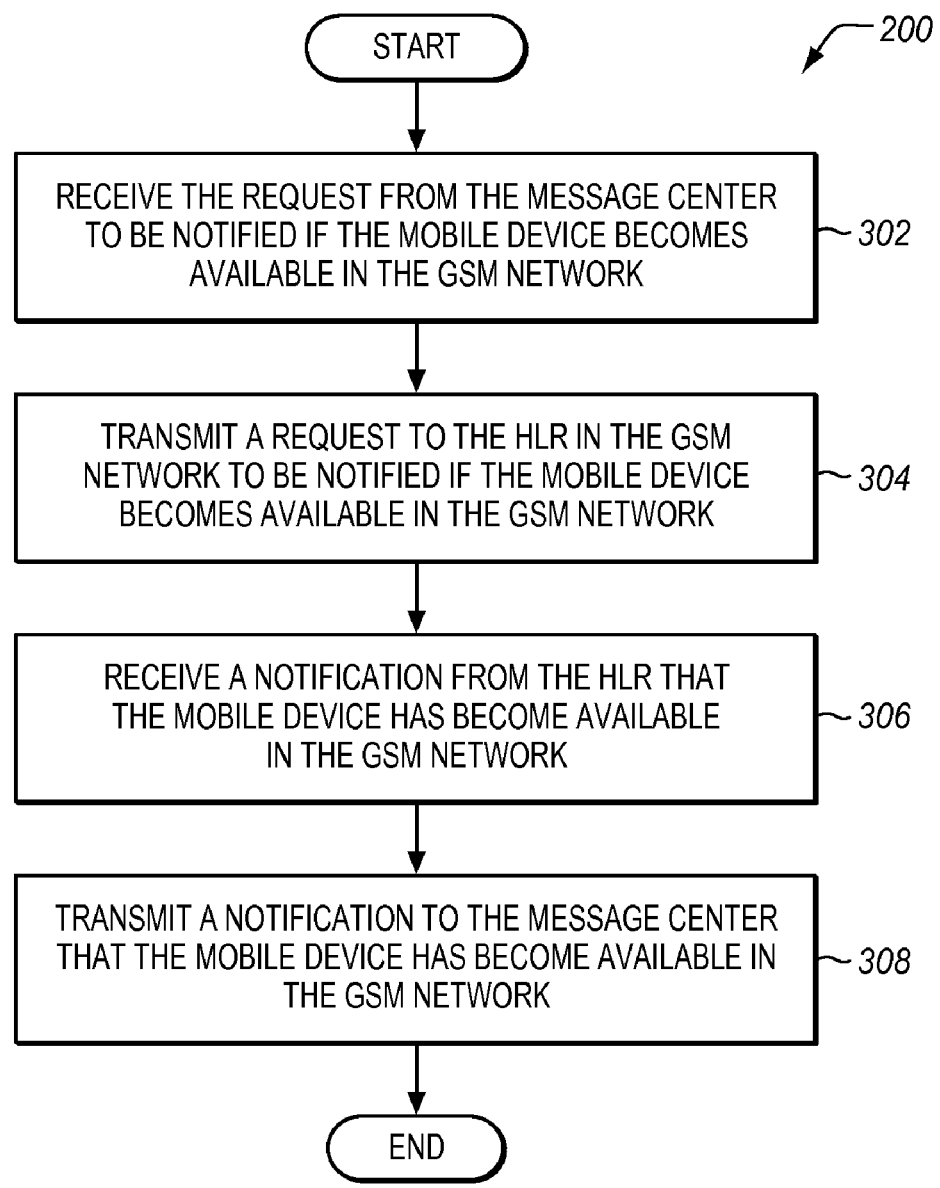

FIG. 3 illustrates the steps of method 200 performed in HSS 136 (although similar steps may be performed in HLR 126). In step 302, HSS 136 receives the request from message center 128. In response to the request, HSS 136 transmits another request to HLR 116 in GSM network 110 to be notified if mobile device 150 becomes available in GSM network 110 in step 304. The request in this embodiment may comprise a MAP AnyTimeModification message. Presently, the MAP AnyTimeModification message is only used by an SCP to request notification for Call Forwarding data change, Call Barring data change, ODB data change, and CAMEL Subscriber Info change. In this embodiment, the MAP interface may be enhanced so that the AnyTimeModification message includes a new parameter for requesting notification if mobile device 150 becomes available in GSM network 110. The new parameter may be entitled "request UE available notification", just as an example. HSS 136 then waits for a notification from HLR 116. The time period that HSS 136 waits is configurable based on the desires of the service provider.

If mobile device 150 does become available in GSM network 110, then HSS 136 receives a notification from HLR 116 that mobile device 150 has become available in GSM network 110 in step 306. The notification in this embodiment may comprise a MAP NoteSubscriberDataChange message. The MAP interface may be enhanced so that the NoteSubscriberDataChange message includes a new parameter indicating that mobile device 150 has become available in GSM network 110. The new parameter may be entitled "UE available indication", just as an example.

In step 308, HSS 136 transmits another notification to message center 128 that mobile device 150 has become available in GSM network 110. The notification in this embodiment may comprise a Diameter Sh Push-Notification-Request (PNR). The Diameter Sh interface may be enhanced so that a new User-Data XML specification is added indicating that mobile device 150 has become available in GSM network 110.

In FIG. 2, message center 128 receives the notification from HSS 136 that mobile device 150 has become available in step 210. In response to the notification, message center 128 initiates delivery of the text message to mobile device 150 over GSM network 110 in step 212. As shown in FIGS. 2-3, HSS 136 acts as a gateway or interworking point between CDMA network 120 and GSM network 110 so that message center 128 is able to request the notification from HLR 116. Through the notification, message center 128 knows that mobile device 150 is now available and there is a greater likelihood that the text message will be successfully delivered to mobile device 150.

In addition to HSS 136 acting as a gateway or interworking point between CDMA network 120 and GSM network 110, message center 138 in IMS network 130 may also be used as a gateway or interworking point. When message center 128 initiates delivery of the text message to mobile device 150 (see step 212), message center 128 may forward the text message to message center 138 in IMS network 130. If this occurs, then process flow transfers to message center 138 as shown in FIG. 4.

Figure 4:
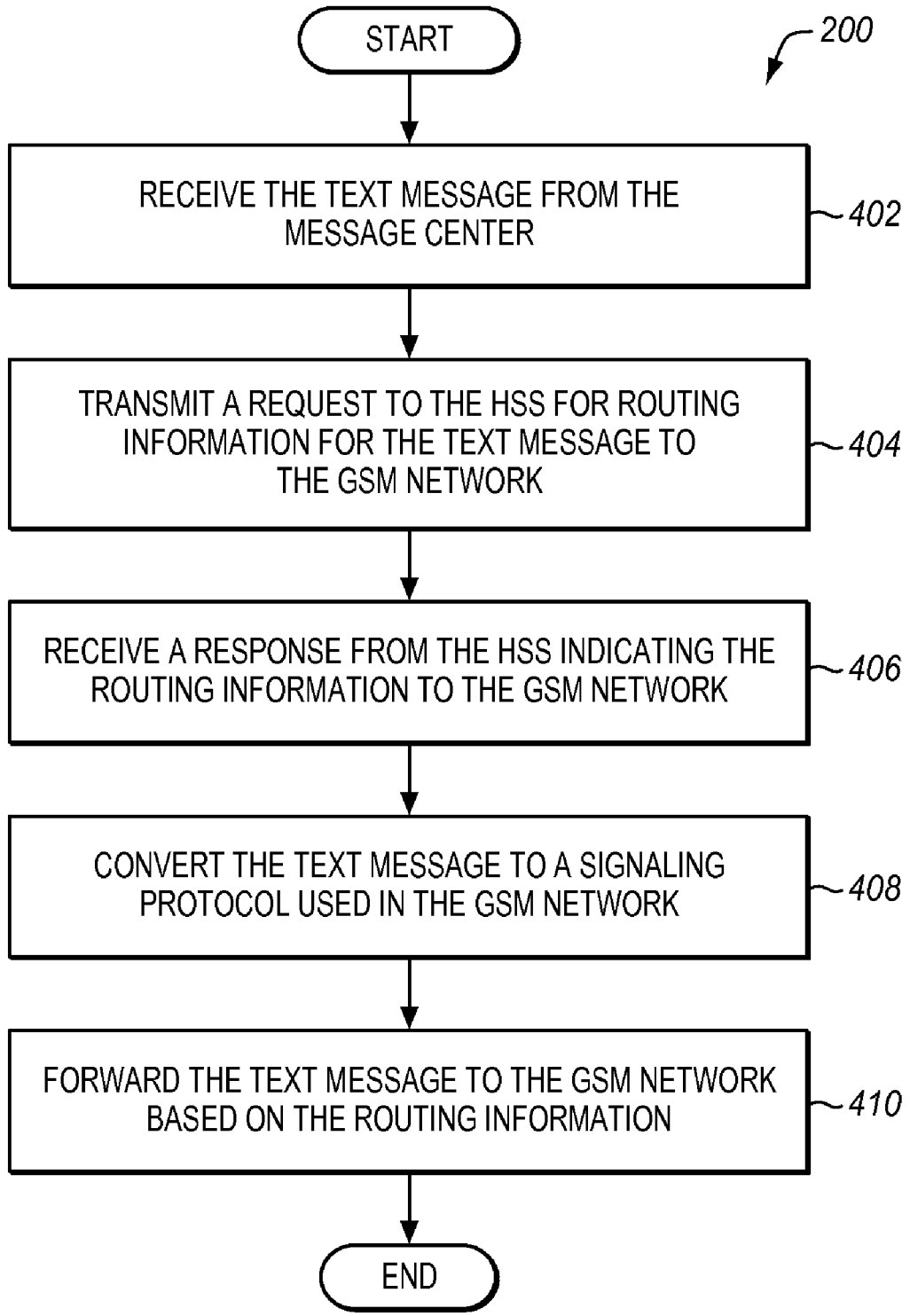

FIG. 4 illustrates the steps of method 200 performed in message center 138. In step 402, message center 138 receives the text message from message center 128. For example, message center 138 may receive a SIP MESSAGE from message center 128 that includes the text message. After receiving the text message, message center 138 determines how to route the text message to GSM network 110 for delivery to mobile device 150. To do so, message center 138 transmits a request to HSS 136 for routing information for the text message to GSM network 110 in step 404. The request in this embodiment may comprise a Diameter Sh User-Data-Request (UDR). The Diameter Sh interface may be enhanced so that a new value in the Data-Reference AVP is added for requesting the routing information for the text message to GSM network 110.

Figure 5:
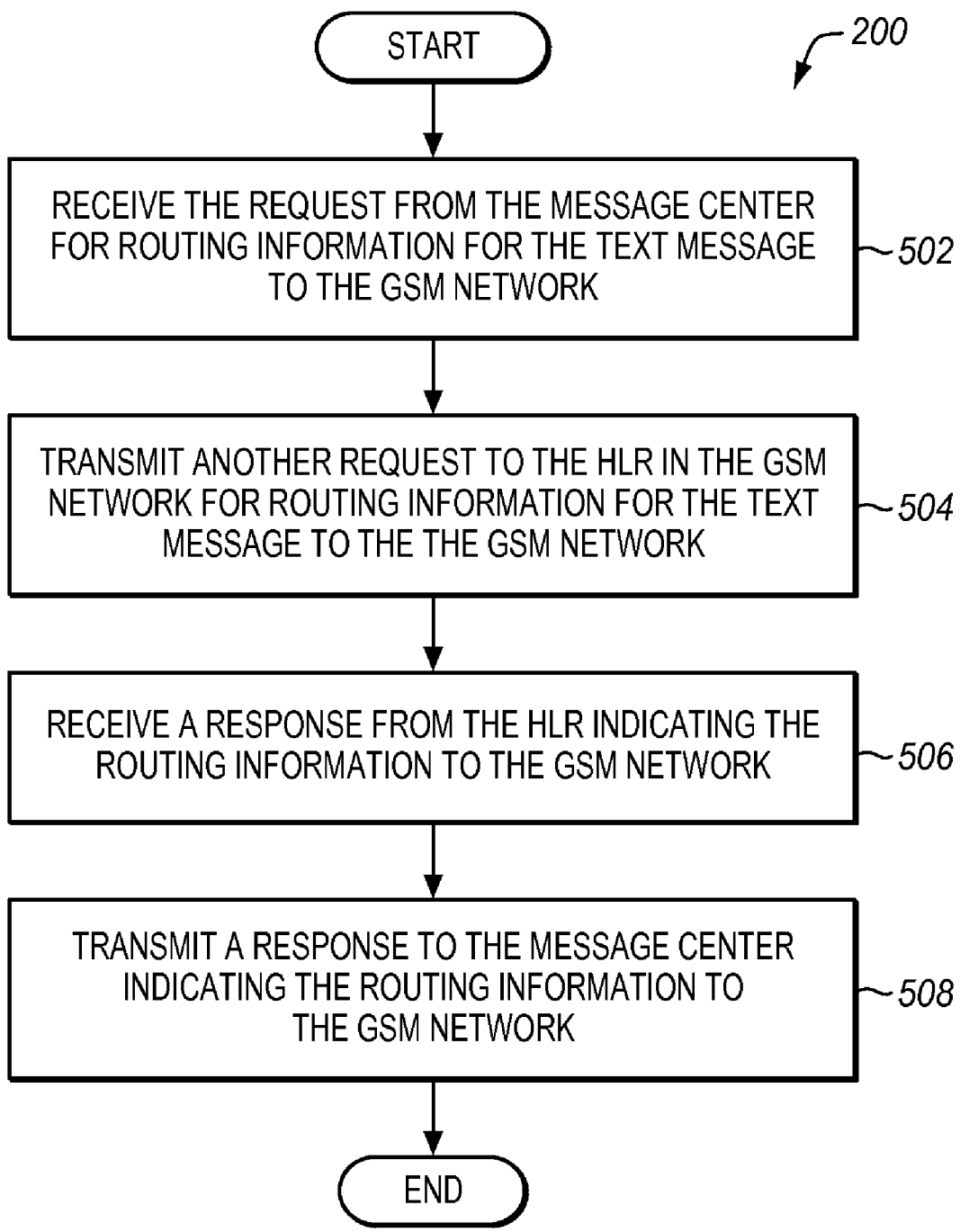

FIG. 5 illustrates further steps of method 200 performed in HSS 136. In step 502, HSS 136 receives the request for routing information from message center 138. Responsive to the request, HSS 136 transmits another request to HLR 116 in GSM network 110 for the routing information in step 504. The request in this embodiment may comprise a MAP Any-TimeInterrogate message. The MAP interface may be enhanced so that the AnyTimeInterrogate message includes a new parameter for requesting the routing information for the text message. The new parameter may be entitled "SendRoutingInfoforSM", just as an example.

In step 506, HSS 136 receives a response from HLR 116 indicating the routing information for the text message. The response from HLR 116 in this embodiment may also comprise a MAP AnyTimeInterrogate message. Again, the MAP interface may be enhanced so that the AnyTimeInterrogate message includes a new parameter for the routing information. In step 508, HSS 136 transmits a response to message center 138 indicating the routing information. The response from HSS 136 in this embodiment may comprise a Diameter Sh User-Data-Answer (UDA). The Diameter Sh interface may be enhanced so that a new User-Data XML specification is added indicating the routing information for the text message to GSM network 110.

In FIG. 4, message center 138 receives the response from HSS 136 that includes the routing information in step 406. In step 408, message center 138 converts or translates the text message to a signaling protocol used in GSM network 110. For example, message center 138 may convert the text message from a SIP MESSAGE to a MAP mt-ForwardSM message. In step 410, message center 138 forwards the text message to GSM network 110 based on the routing information. For example, message center 138 may forward the text message to MSC 114 in GSM network 110 based on the routing information. MSC 114 will then attempt to deliver the text message to mobile device 150. Because mobile device 150 is presently available over GSM network 110 (based on the notification), the delivery attempt will likely be successful.

The method 200 shown in FIGS. 2-5 provides an effective way of performing message delivery from a message center outside of GSM network 100. Although the above example was illustrated using message center 128 in CDMA network 120, a similar method may be used for other message centers, such as message center 138 in IMS network, or another message center not shown in FIG. 1.

EXAMPLE

Figure 6:
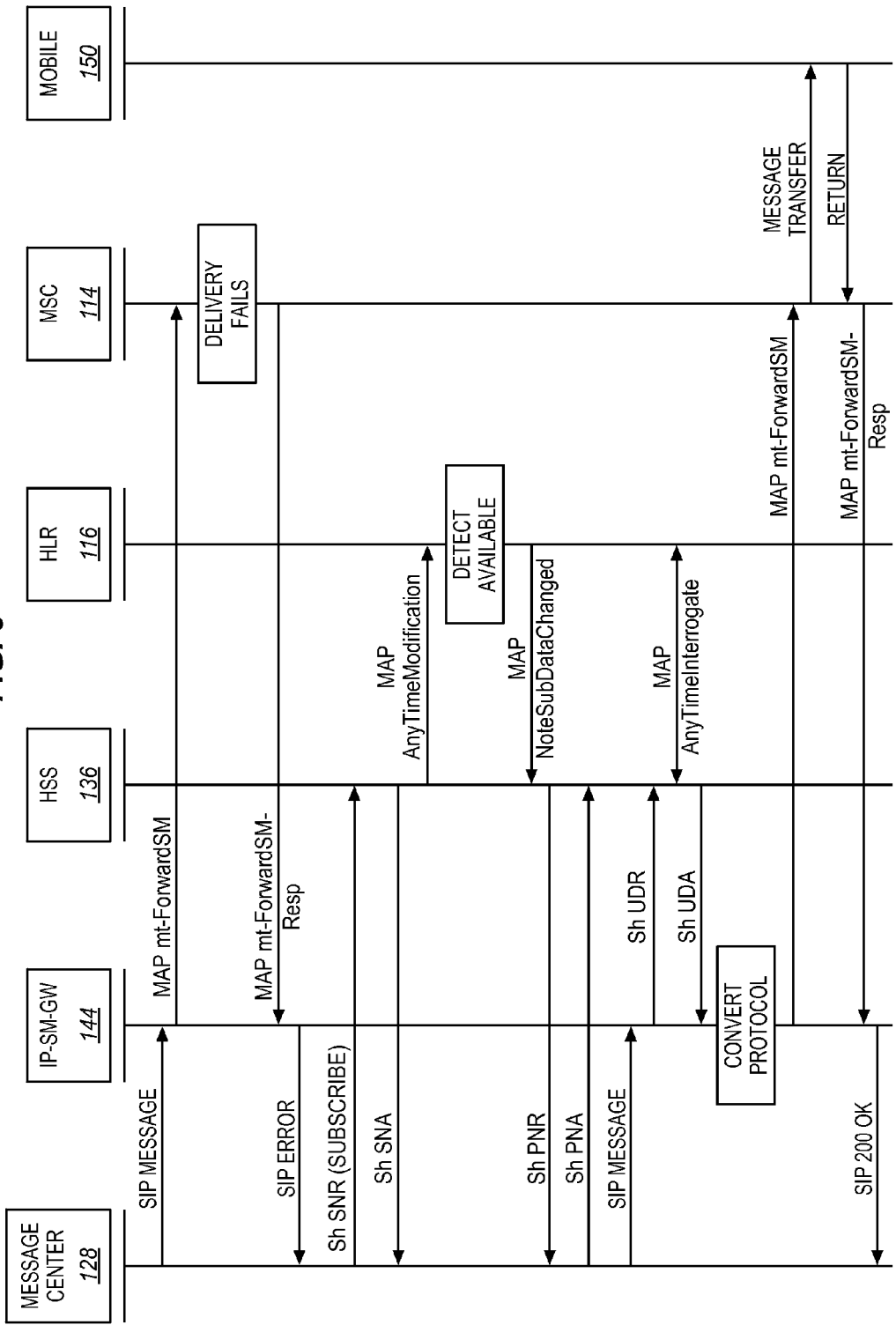
FIG. 6 is a message diagram illustrating delivery of an SMS message from a CDMA network to a GSM network in an exemplary embodiment.

FIG. 6 is a message diagram illustrating delivery of an SMS message from CDMA network 120 to GSM network 110 in an exemplary embodiment. In this example, one assumption is that mobile device 150 has registered with GSM network 110 and at some point after registration becomes temporarily unavailable. In FIG. 6, message center 128 in CDMA network 120 receives an SMS message that is intended for mobile device 150. In response to the SMS message, message center 128 forwards the SMS message to IP-SM-GW 144 in IMS network 130 by transmitting a SIP MESSAGE. IP-SM-GW 144 converts the SMS message to a protocol used by GSM network 110, which means converting the SIP MESSAGE into a MAP mt-ForwardSM message. IP-SM-GW 144 will query HSS 136 or HLR 116 to find out that mobile device 150 is registered in GSM network 110 (steps not shown in FIG. 6). IP-SM-GW 144 then sends the MAP mt-ForwardSM message to MSC 114 in GSM network 110. In response to the MAP mt-ForwardSM message, MSC 114 will attempt to deliver the SMS message to mobile device 150 through BSS 112. However, mobile device 150 is temporarily unavailable during the delivery attempt, and the delivery attempt fails. MSC 114 sends a MAP mt-ForwardSM-res to IP-SM-GW 144 indicating that the delivery attempt failed. IP-SM-GW 144 then sends a SIP ERROR to message center 128 indicating that the delivery attempt failed.

Instead of just entering a retry process after failure of the initial delivery attempt, message center 128 requests to be notified if mobile device 150 becomes available in GSM network 110 through HSS 136. To do so, message center 128 sends a Diameter Sh Subscription-Notification-Request (SNR) to HSS 136. The SNR is enhanced so that the Data-Reference AVP in the SNR includes a new reference value that requests notification if mobile device 150 becomes available in GSM network 110. HSS 136 receives and processes the SNR from message center 128. HSS 136 then subscribes to HLR 116 to be notified if mobile device 150 becomes available in GSM network 110. To do so, HSS 136 sends a MAP AnyTimeModification message to HLR 116. The AnyTimeModification message is enhanced to include a new parameter for requesting notification if mobile device 150 becomes available in GSM network 110. In response to receiving the AnyTimeModification message, HLR 116 monitors mobile device 150 via MSC 114 to see if it becomes available in GSM network 110. For example, HLR 116 may monitor for outgoing calls placed by mobile device 150, may monitor for incoming calls that are answered by mobile device 150, may monitor for SMS messages that originate from mobile device 150, or may monitor for SMS messages that are successfully delivered to mobile device 150. HLR 116 may monitor for a variety of events that indicate mobile device 150 is now available in GSM network 110.

If HLR 116 does detect that mobile device 150 has become available in GSM network 110, then HLR 116 notifies HSS 136 by sending a MAP NoteSubscriberDataChange message to HSS 136. The NoteSubscriberDataChange message is enhanced to include a new parameter indicating that mobile device 150 has become available in GSM network 110. HSS 136 then notifies message center 128 that mobile device 150 has become available by sending a Diameter Sh Push-Notification-Request (PNR). The PNR is enhanced with a new User-Data XML specification indicating that mobile device 150 has become available in GSM network 110. The PNR thus informs message center 128 that mobile device 150 has become available in GSM network 110.

Message center 128 may now initiate another delivery attempt of the SMS message to mobile device 150. To do so, message center 128 forwards the SMS message to IP-SM-GW 144 in a SIP MESSAGE. After receiving the SIP MESSAGE, IP-SM-GW 144 needs to determine how to route the SMS message to GSM network 110. Thus, IP-SM-GW 144 sends a Diameter Sh User-Data-Request (UDR) to HSS 136. The UDR is enhanced with a new value in the Data-Reference AVP for requesting the routing information for the SMS message. HSS 136 receives and processes the UDR from message center 128. HSS 136 then sends a request to HLR 116 for routing information for the SMS message. To do so, HSS 136 sends a MAP AnyTimeInterrogate message to HLR 116. The AnyTimeInterrogate message is enhanced to include a new parameter for requesting the routing information.

In response to receiving the AnyTimeInterrogate message, HLR 116 identifies routing information for the SMS message, such as a routing address or point code for MSC 114 that is serving mobile device 150. HLR 116 then provides the routing information to HSS 136 by sending an AnyTimeInterrogate response to HSS 136 that includes a new parameter for the routing information.

In response to receiving the routing information, HSS 136 provides the routing information to IP-SM-GW 144 by sending a Diameter Sh User-Data-Answer (UDA). The UDA is enhanced with a new User-Data XML specification that indicates the routing information for the SMS message to GSM network 110. IP-SM-GW 144 then converts or translates the SMS message to a signaling protocol used in GSM network 110. For example, IP-SM-GW 144 converts the SIP MESSAGE to a MAP mt-ForwardSM message. IP-SM-GW 144 then forwards the MAP mt-ForwardSM message, which includes the SMS message, to MSC 114 based on the routing information. MSC 114 will then attempt to deliver the SMS message to mobile device 150 (over BSS 112) with a message transfer.

Because mobile device 150 is presently available over GSM network 110 (based on the notification), the delivery attempt will likely be successful. Assuming the attempt was successful, mobile device 150 responds with a return message indicating successful delivery. MSC 114 then responds to IP-SM-GW 144 with MAP mt-ForwardSM-res response indicating that message delivery was successful. IP-SM-GW 144 then sends a SIP 200 OK to message center 128 indicating successful delivery. At this point, message center 128 has effectively delivered the SMS message to mobile device 150, even though mobile device 150 was temporarily unavailable over GSM network 110, without wasting network resources.

Although this example showed message delivery from message center 128 in CDMA network 120, a similar message flow may be used to deliver SMS messages from other message centers outside of GSM network 110.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   a Home Subscriber Server (HSS) of an IP Multimedia Subsystem (IMS) network that connects to a first wireless network that serves a mobile device, and connects to a message center in a second wireless network that attempts to deliver a text message to the mobile device over the first wireless network but the delivery attempt fails due to the mobile device being temporarily unavailable;
   the HSS is operable to receive a first request from the message center in the second wireless network to be notified if the mobile device becomes available in the first wireless network, and to transmit a second request to a Home Location Register (HLR) in the first wireless network to be notified if the mobile device becomes available in the first wireless network;
   the HSS is further operable to receive a first notification from the HLR in the first wireless network that the mobile device has become available, and to transmit a second notification to the message center in the second wireless network that the mobile device has become available to allow the message center to retry delivery of the text message to the mobile device.

2. The system of claim 1 wherein the first request comprises a Diameter Sh Subscription-Notification-Request, where the Subscription-Notification-Request includes a new value in a Data-Reference AVP for requesting notification if the mobile device becomes available.

3. The system of claim 1 wherein the second request comprises a MAP AnyTimeModification message, where the AnyTimeModification message includes a new parameter for requesting notification if the mobile device becomes available.

4. The system of claim 1 wherein the first notification comprises a MAP NoteSubscriberDataChange message, where the NoteSubscriberDataChange message includes a new parameter indicating that the mobile device has become available.

5. The system of claim 1 wherein the second notification comprises a Diameter Sh Push-Notification-Request, where the Push-Notification-Request includes a new User-Data XML specification indicating that the mobile device has become available.

6. The system of claim 1 further comprising:
a message gateway in the IMS network that is operable to receive the text message from the message center, and to transmit a third request to the HSS for routing information for the text message to the first wireless network;
wherein the HSS is further operable to transmit a fourth request to the HLR in the first wireless network for the routing information, to receive a first response from the HLR in the first wireless network indicating the routing information, and to transmit a second response to the message gateway indicating the routing information.

7. The system of claim 6 wherein:
the message gateway is further operable to convert the text message to a signaling protocol used in the first wireless network, and to forward the text message to the first wireless network based on the routing information for delivery to the mobile device.

8. The system of claim 6 wherein the third request comprises a Diameter Sh User-Data-Request, where the User-Data-Request includes a new value in a Data-Reference AVP for requesting the routing information for the text message.

9. The system of claim 6 wherein the fourth request comprises a MAP AnyTimeInterrogate message, where the AnyTimeInterrogate message includes a new parameter for requesting the routing information for the text message.

10. The system of claim 6 wherein the second response comprises a Diameter Sh User-Data-Answer, where the User-Data-Answer includes a new User-Data XML specification indicating the routing information for the text message.

11. A method comprising:
receiving a first request in a Home Subscriber Server (HSS) of an IP Multimedia Subsystem (IMS) network that connects to a first wireless network that serves a mobile device, and connects to a message center in a second wireless network that attempts to deliver a text message to the mobile device over the first wireless network but the delivery attempt fails due to the mobile device being temporarily unavailable;
wherein the first request is received from the message center asking to be notified if the mobile device becomes available in the first wireless network;
transmitting a second request from the HSS to a Home Location Register (HLR) in the first wireless network to be notified if the mobile device becomes available in the first wireless network;
receiving a first notification in the HSS from the HLR that the mobile device has become available; and
transmitting a second notification from the HSS to the message center in the second wireless network that the mobile device has become available to allow the message center to retry delivery of the text message to the mobile device.

12. The method of claim 11 wherein the first request comprises a Diameter Sh Subscription-Notification-Request, where the Subscription-Notification-Request includes a new value in a Data-Reference AVP for requesting notification if the mobile device becomes available.

13. The method of claim 11 wherein the second request comprises a MAP AnyTimeModification message, where the AnyTimeModification message includes a new parameter for requesting notification if the mobile device becomes available.

14. The method of claim 11 wherein the first notification comprises a MAP NoteSubscriberDataChange message, where the NoteSubscriberDataChange message includes a new parameter indicating that the mobile device has become available.

15. The method of claim 11 wherein the second notification comprises a Diameter Sh Push-Notification-Request, where the Push-Notification-Request includes a new User-Data XML specification indicating that the mobile device has become available.

16. The method of claim 11 further comprising:
receiving the text message from the message center in a message gateway in the IMS network;
transmitting a third request from the message gateway to the HSS for routing information for the text message to the first wireless network;
transmitting a fourth request from the HSS to the HLR in the first wireless network for the routing information;
receiving a first response in the HSS from the HLR in the first wireless network indicating the routing information; and
transmitting a second response from the HSS to the message gateway indicating the routing information.

17. The method of claim 16 further comprising:
converting the text message in the message gateway to a signaling protocol used in the first wireless network; and
forwarding the text message from the message gateway to the first wireless network based on the routing information for delivery to the mobile device.

18. The method of claim 16 wherein the third request comprises a Diameter Sh User-Data-Request, where the User-Data-Request includes a new value in a Data-Reference AVP for requesting the routing information for the text message.

19. The method of claim 16 wherein the fourth request comprises a MAP AnyTimeInterrogate message, where the AnyTimeInterrogate message includes a new parameter for requesting the routing information for the text message.

20. The method of claim 16 wherein the second response comprises a Diameter Sh User-Data-Answer, where the User-Data-Answer includes a new User-Data XML specification indicating the routing information for the text message.

* * * * *